United States Patent
Buwalda et al.

(10) Patent No.: US 7,282,230 B2
(45) Date of Patent: Oct. 16, 2007

(54) HEAT-STABLE HIGH-AMYLOPECTIN STARCH

(75) Inventors: Pieter Lykle Buwalda, Groningen (NL); Roelfina Willemina A. Thürkow, Groningen (NL)

(73) Assignee: Cooperatieve Verkoop-en Productievereniging van Aardappelmeel Derivaten AVEBE B.A., Veendam (NL)

( * ) Notice: Subject to any disclaimer, the term of this patent is extended or adjusted under 35 U.S.C. 154(b) by 0 days.

(21) Appl. No.: 10/236,435

(22) Filed: Sep. 6, 2002

(65) Prior Publication Data

US 2003/0087006 A1 May 8, 2003

Related U.S. Application Data

(63) Continuation of application No. 09/743,491, filed on Mar. 23, 2001, now abandoned.

(30) Foreign Application Priority Data

Jul. 31, 1998 (EP) .................................. 98202591

(51) Int. Cl.
*A21D 13/00* (2006.01)

(52) U.S. Cl. ..................... 426/94; 426/549; 426/570; 426/572; 426/579

(58) Field of Classification Search ................. 426/94, 426/549, 578, 573, 570, 572, 579, 589
See application file for complete search history.

(56) References Cited

FOREIGN PATENT DOCUMENTS

| EP | 0 796 868 A2 | 9/1997 |
|---|---|---|
| EP | 0796868 A2 * | 9/1997 |
| EP | 0 799 837 A2 | 10/1997 |
| EP | 0799837 A2 * | 10/1997 |
| JP | 63022148 | 1/1988 |
| WO | WO92/1137 | 7/1992 |

OTHER PUBLICATIONS

"Nieuwe, mogelijkheden met amylopectine-aardapelzetmeel", by de Vries, A., *ingrediënten & biotechnologie*, vol. 28, No. 23, at pp. 26-27, Nov. 1995.

Dr. Pieter Buwalda, "Sheer versatility," *Potato Business World*, May/Jun. 1998.

* cited by examiner

*Primary Examiner*—Lien Tran
(74) *Attorney, Agent, or Firm*—Hoffman & Baron, LLP

(57) ABSTRACT

The invention relates to starch used in the baking-industry. Creams, (fruit-) fillings, toppings, glazes and other bakery products are often thickened by the inclusion of a certain amount of starch as binder, filling or thickening agent, for example providing gel-strength, viscosity, glaze, texture or creaminess to the cream or filling. Commonly used starches have insufficient stability to for example heat applied during baking. The invention provides a starch-containing filling or topping for a bakery product wherein said starch comprises a tuber or root starch containing less than about 5% amylose and use of such a filling or topping for improving a bakery product. Furthermore, the invention provides a heat-stable starch and bakery products comprising a heat-stable starch.

10 Claims, No Drawings

HEAT-STABLE HIGH-AMYLOPECTIN STARCH

The present application is a continuation of, and claims priority to, U.S. application Ser. No. 09/743,491, having a filing date of Mar. 23, 2001 now abandoned.

BACKGROUND OF THE INVENTION

The invention relates to starch used in the baking-industry in starch-containing fillings or toppings, such as bakery cream, Swiss cream, fruit filling, savoury or sweet pie filling, almond paste filling, choux pastry filling, pizza topping, glazes on pastry or snacks and such.

Creams, fruit- or piefillings, toppings, glazes and other fillings or toppings for use in bakery products are often thickened by the inclusion of a certain amount of starch as binder, filling or thickening agent, for example providing gel-strength, viscosity, glaze, texture or creaminess to the cream or filling.

Many factors influence a decision to apply a particular ingredient or additive in a bakery product. These may include functional properties, cost or, perhaps most importantly, the regional preference for taste, mouth feel and texture. Moreover many different processing technologies are used in the baking industry also affecting the properties of the bakery product.

Starches are widely applied in fruit fillings, creams, other fillings, topics and glazes often in conjunction with hydrocolloids such as alginates, pectin, gelatin and others. In cold prepared fruit fillings, a starch should provide clarity, rapid viscosity built-up and a smooth shiny appearance. If a pulpy, more fruity appearance is required this can be achieved by applying coarser products. In cook up preparations the clarity and shininess are of importance as well and a partial pectin replacement is sometimes possible.

SUMMARY OF THE INVENTION

In bakery creams, starches should impart high viscosity, and a creamy sensation in the mouth as well as give a creamy and shiny appearance. For almond paste fillings, coarsely ground instant starch derivatives are often applied. And for savory fillings such as in pizza toppings a wide range of derivatives is known.

In all these applications the filling or topping should have a certain resistance towards the baking process. For instance, if a bakery cream looses its viscosity during the baking the cream simply runs out of the product giving the product an unpalatable appearance.

Often, in a bakery cream, apart from starch derivatives, other hydrocolloids, in particular alginates, are applied for the gelling properties. The baking stability of a cream may be improved by applying an alginate with a higher temperature resistance. However, this leads to products with a less desirable texture, often being somewhat foamy or sometimes being even brittle after baking, therefore, preferably alginates or other heat-stable hydrocolloids are used sparingly as additives to a bakery product.

Today's industry becomes increasingly demanding of derivatives used in bakery products with respect to baking stability, and acid- and shear stability. Modern bakeries work with high temperatures, e.g. 30 minutes baking at 200° C. is not uncommon, still the cream, topping, glazing or filling should not run out. In general, waxy corn starches and derivatives thereof are used in bakery products, since these tend to have a somewhat higher baking stability than (derivatives from) common potato starch or common corn starch, which are commonly used in the food industry, despite the fact that corn starches in general are less viscous and thus need to be applied in higher dose, and often have a prominent, not always appreciated taste, which is an additional disadvantage over potato starch. Furthermore, even waxy corn (maize) starch looses its stability, gel-strength or viscosity under most of today's baking conditions, demonstrating that heat-stable starches are needed.

The invention provides a starch-containing filling or topping for a bakery product wherein said starch comprises a tuber or root starch having an amylopectine:amylose ratio of at least 90:10, preferably at least 95:5, more preferably at least 99:1.

Starches, both of the common variety containing both amylose and amylopectin, obtained from cereals or from tubers or roots and of the waxy variety, obtained from cereals, are widely used in foodstuff.

DETAILED DESCRIPTION OF THE INVENTION

Common starch consists of two major components, an, in essence, linear $\alpha(1-4)$D-glucan polymer (branching is found at a low level) and an elaborately branched $\alpha(1-4$ and $1-6)$D-glucan polymer, called amylose and amylopectin, respectively. Amylose has, in solution, a helical conformation with a molecular weight of $10^4$-$10^5$, or higher. Amylopectin consists of short chains of $\alpha$-D-anhydroglucopyranose units primarily linked by (1-4) bonds with (1-6) branches and with a molecular weight of up to $10^7$, or higher.

Amylose/amylopectin ratios in native starches in plants are generally anywhere at 10-40 amylose/90-60% amylopectin, also depending on the variety of plant studied. In a number of plant species mutants are known which deviate significantly from the above mentioned percentages. These mutants have long been known in maize (corn) and some other cereals. Waxy corn or waxy maize has been studied since the beginning of this century. Therefore, the term waxy starch has often been equated with amylose free starch, despite the fact that such starch was in general not known from other starch sources such as potato but mainly derived from corn. Furthermore, industrial use of an amylose free potato starch (containing essentially only amylopectin molecules) has never occurred, certainly not on the large scale and with such a wide range of applications as seen with waxy starch from corn.

The invention now provides a filling or topping for a bakery product wherein said starch comprises a tuber or root starch having a amylopectine:amylose ratio of at least 90:10, preferably at least 95:5, more preferably at least 99:1 having improved stability over fillings or toppings commonly used in the baking industry. Said improved stability for example relates to freeze-thaw stability or storage of the filling or topping. In a preferred embodiment of the invention a filling or topping is provided having improved heat stability over fillings or toppings commonly used in the baking industry. (A tuber or root starch having a amylopectine:amylose ratio of at least 90:10, preferably at least 95:5, more preferably at least 99:1 is herein also called a heat-stable starch).

In a preferred embodiment a filling or topping according to the invention is provided wherein said tuber or root starch comprises a potato starch. Amylose production in a plant is among others regulated by the enzyme granule-bound starch synthase (GBSS), which is involved in generating the amylose content of starch, and it has been found that many of the available waxy plant mutants lack this enzyme or its activity, thereby causing the essentially exclusive amylopectin character of these mutants. Although in general not (yet) industrially used, amylose free potato mutants are available for starch production, producing a starch containing essentially only amylopectin molecules.

An example of a heat-stable starch provided by the invention is a starch obtained from an amylose-free potato plant which is for example lacking GBSS activity or GBSS protein altogether, thereby lacking amylose and having essentially only amylopectin molecules.

In another embodiment of the invention a filling or topping is provided wherein said tuber or root starch is derived from a genetically modified plant such as a potato, yam, banana or cassava having reduced amylose content or comprising essentially only amylopectin molecules. Genetic modification of plants is a skill available to the artisan, and for example involves modification, deletion of or insertion in or (antisense) reversion of (parts of) a gene, such as a gene encoding granule-bound starch synthase (GBSS), which is involved in determining the amylose content of starch. In order to manipulate such crop plants, efficient transformation systems and isolated genes are available, especially of potato, and others are found by analogy. Traits, such as absence of amylose, that are introduced in one variety of a crop plant can easily be introduced into another variety by cross-breeding.

In the experimental part of this description, a filling or topping for a bakery product is provided comprising a heat-stable starch obtained from a genetically modified or amylose-free potato. Use of starch from genetically engineered crops has in general been suggested from the time on it was possible to genetically modify such crops (see i.e. Bruinenberg et al., Chemistry and Industry, Nov. 6, 1995, page 881-884; de Vries, Foodmarketing and Technology, April 1997, page 12-13)). Specific use of amylopectin-type potato starch as filling or viscosity agent in canning has been suggested in WO/97/03573 to prevent undesired residual viscosity seen with commonly used starch. Furthermore, EP 0 796 868 suggests use of a hydroxypropylated and cross-linked waxy potato starch to increase the viscosity of a food product.

However, none of these provide indications on how to avoid using starches in today's baking-industry which generally have low- or insufficient stability to heat and compromise at least the palatability, texture, appearance or other related aspects of baking products.

In a much preferred embodiment of the invention a filling or topping is provided wherein said heat-stable tuber or root starch is a cross-linked starch such as a di-starch phosphate or a di-starch adipate. Crosslinking starch is in itself a method available to the artisan, various cross-linking agents are known, examples are epichlorohydrin, sodium trimetaphosphate (STMP), phosphorous oxychloride ($POCl_3$), acrolein, adipic anhydride (Adip) or other reagents with two or more anhydride, halogen, halohydrin or epoxide groups or combinations which all can be used as crosslinking agents. Typical and often preferred examples of such a cross-linked starch are di-starch-phosphate or di-starch-adipate.

In yet another embodiment of the invention a filling or topping is provided wherein said tuber or root starch is a stabilised starch such as a starch acetate. Stabilisation by hydroxyalkylation of starch is for example obtained with reagents containing a halogen, halohydrin, or epoxide group as reactive site. Other reagents are for example 1-octenyl succinic anhydride, sodium tripolyphosphate, potassium orthophosphate, sodium orthophosphate or orthophosphoric acid.

In one embodiment of the invention said starch is stabilised by hydroxypropylation, for example using propylene oxide. In a preferred embodiment of the invention, said starch is a stabilised starch in which some or all of the available hydroxyl groups of the amylopectin molecules have been esterified by acetyl groups. The addition of acetyl groups is generally done in aqueous suspensions of starch using acetic anhydride, succinic anhydride or vinyl acetate as reactants under alkaline conditions. A typical and often preferred example of such a stabilised starch is a starch-acetate.

Crossbonding and/or stabilising reagents are reacted with starch under alkaline conditions. Suitable alkali materials are: sodium hydroxide, potassium hydroxide, ammonium hydroxide, magnesium hydroxide, sodium carbonate and trisodium phosphate. Preferred are the alkali metal hydroxides and carbonates, most preferred are sodium hydroxide and sodium carbonate. Sometimes salts are added as to prevent swelling under alkaline reaction conditions. Preferred are sodium chloride and sodium sulfate.

Crossbonded starch acetates comprised in a heat stable starch provided by the invention in general have an acetyl content which corresponds to a DS or degree of substitution of 0.001 to 0.2, preferably from 0.03 to 0.092, most preferably from 0.05 to 0.092. The term DS used herein indicates the average number of sites per anhydroglucose unit of the starch molecule in which there are substituent groups.

Crossbonded hydroxypropylated starches comprised in a heat stable starch provided by the invention have in general a hydroxypropyl content which corresponds to a DS of 0.001 to 0.3, preferably, 0.03 to 0.21, most preferably 0.06 to 0.21. Heat-stable distarch-acetate may for example be cross-bonded with 0.001 to 0.024% of adipic anhydride, preferably with 0.01 to 0.12%. Prior to crossbonding with adipic anhydride the starch may be treated with hydrogen peroxide and/or peracetic acid. Preferably with a quantity which corresponds with 0.001% to 0.045% of active oxygen, most preferably with 0.005 to 0.45%. Heat-stable distarch phosphate may for example be crossbonded with sodium trimetaphosphate up to such a degree that the residual phosphate is no more than 0.14% for an amylopectin potato starch or 0.4% for other root and tuber starches. Preferably the starch is crossbonded with 0.01% to 0.25% of sodium trimetaphosphate, most preferably with 0.25 to 0.15%, under conditions known to the artisan. Of course it is always possible for the artisan to find conditions in which the reactants react with a very low yield, outside of the preferred conditions resulting in heat-stable starches with the derived properties.

Heat-stable distarch phosphate may as well be crossbonded with phosphorous oxychloride up to such a degree that the residual phosphate is not more than 0.14% for an amylopectin potato starch or 0.4% for other root and tuber starches. Preferably the starch is crossbonded with 0.0001% to 0.01% of phosphorous oxychloride, under conditions known to the artisan. Of course it is always possible for the artisan to find conditions in which the reactants react with a very low yield, outside of the preferred conditions, resulting in heat-stable starches with the derived properties.

In a preferred embodiment a filling or topping comprising a heat-stable instant starch is provided by the invention, which for example allows application in cold-prepared fruit fillings to bind fruit juice or in bakery jams and application in cold-mix bakery creams, providing a high viscosity and a smooth creamy texture. Furthermore, the invention provides use of said heat-stable instant starch in instant pastry or cake mixes and such.

In general starch and starch derivatives for the food industry are insoluble in cold water. Viscosity and water binding is achieved by heating or cooking. These starches are referred to as cook-up starches. For convenience starches are sometimes pregelatinised i.e. precooked and dried. These starches are referred to as instant starches and perform without heating or cooking in the food stuff. Pregelatinisation can be achieved by spray cooking, spray drying, roll drying, drum drying, extrusion, heating in aqueous water miscible organic solvents or under high pressure or with other methods known in the art.

Provided by the invention is for example a filling or topping wherein the starch present is a tuber or root starch having an amylopectine:amylose ratio of at least about 90:10. Such a filling or topping is for example further composed of non-starch products such as meat, eggs, milk, aroma's, and finds for example application in savoury snack fillings or toppings wherein a heat-stable starch according to the invention is the only starch source. In such a topping or filling, also other desired properties of a starch in general may be used to arrive at a product with palatable texture and appearance.

The invention also provides a filling or topping comprising a heat stable starch according to the invention which is further comprising a starch having an amylopectine:amylose ratio of less than 90:10. In general, fruit fillings comprise fruit or fruit remains that contain the usual starches not having amylopectine:amylose ratio's found in heat stable starches. It is furthermore possible to use commonly used starches in fillings or toppings to provide the product with certain, for example desired viscosity characteristics next to using a heat-stable starch according to the invention to arrive at a desired stability. Moreover, products, such as fillings containing for example potato mash or even potato slices for savoury snacks will benefit from using a heat-stable starch according to the invention, having been provided with better stability, for example upon baking.

In yet another embodiment of the invention a filling or topping according to the invention is provided further comprising a hydrocolloid such as an alginate pectin or gelatin. In the experimental part it is demonstrated that for example the gel strength and resistance to baking of a bakery product such as a bakery cream or fruit filling, prepared with a heat stable starch according to the invention is in general higher than the gel strength of a bakery cream prepared with common potato starch or waxy maize starch despite the fact that the viscosity of the different starches in the various preparations is about the same or at least comparable. This results in very favourable bake-out percentages. For example, in bakery cream comprising a hydrocolloid such as an alginate which is not highly stable upon baking, a heat stable starch according to the invention shows far superior baking stability (bake-out percentages i.e. 2, 11, 9, 16) over the baking stability obtained with common potato starch (31, 28, 26) and waxy maize starch (24, 18).

To get comparable results with common potato starch or waxy maize starch, it is necessary to include a much more heat-stable hydrocolloid in the recipe. Only than it is possible to obtain bake-out percentages for these products (i.e. 9, 9, 8, 8, 2) that are obtained with a heat-stable starch according to the invention using a more modestly stable hydrocolloid.

The invention furthermore provides use of a tuber or root starch having an amylopectine:amylose ratio of at least 90:10 for producing a filling or topping for a bakery product, for example for improving the baking stability of a starch-containing filling or topping for a bakery product such as a bakery cream, fruit or pie filling, topping or glaze. Such use comprises adding to said filling or topping a heat-stable starch according to the invention for example containing less than about 10-5% amylose molecules. Herewith the invention provides a method wherein the texture and palatability of said bakery good comprising such a cream, (fruit-) filling, topping or glaze after baking is improved over a texture and palatability seen when using commonly used starches or starch derivatives.

For example, as demonstrated herein in the examples, a heat-stable starch providing stability as provided by the invention provides far better gel-strength or viscosity after baking (expressed as baking stability, bake-out or as the ratio of viscosity before and after baking) to a bakery cream or fruit filling than commonly used starches do. This not only gives the bakery product a taste advantage over commonly used waxy corn starch but also allows for reducing the starch dosage that is considered necessary altogether or allows for using less alginates, or using only modestly heat-stable alginates, allowing for inexpensive production of bakery goods.

In a preferred embodiment the invention provides use according to the invention wherein said tuber or root starch comprises a potato starch. Use of heat-stable starch as provided by the invention is preferably done with root or tuber-derived amylose-free or amylopectin native starches such as obtainable from potato starch, tapioca, sweetroot starch, yam starch, canna starch or manihot starch. In one embodiment of the invention such a tuber or root starch is derived from an amylose free potato mutant, as described above. In another embodiment of the invention such a root or tuber starch is derived from a genetically modified plant, for example from a genetically modified potato plant variety. Examples of such a potato plant variety are the variety Apriori or Apropect, or varieties derived thereof.

The invention also provides use of a heat stable starch according to the invention in a bakery cream, where it provides excellent baking stability, reducing bake-out percentages as explained above and use of a heat stable starch in a fruit filling, reducing viscosity loss or improving viscosity upon baking.

The invention furthermore provides a bakery product comprising a starch-containing filling or topping according to the invention. Examples of such bakery products vary from savoury snacks to pastry, and from pizzas to fruit pies, and include pre-made or ready-made bakery cream, pre-made filling such as a fruit- or pie-filling, topping, glaze, pastry or cake mix comprising a heat-stable starch according to the invention. These, and many other comprising a topping or filling comprising a heat stable starch have improved appearance and texture over products made with commonly used starches.

The invention furthermore provides a tuber or root starch having an amylopectine:amylose ratio of at least 90:10 for use in a filling or topping for a bakery product. In a preferred embodiment, said starch is a potato starch, as exemplified in the experimental part of the description.

Also, the invention provides use of heat-stable starch or derivatives derived from said starch in bakery products and bakery half-products. In addition the invention provides a method for providing heat-stability to bakery cream, (fruit) filling, topping, glaze, pastry mix or cake mix comprising use of heat stable starch or derivatives derived from said starch. The baking stability of a cream or other product may now be improved by applying a heat-stable starch according to the invention instead of by applying an alginate or other hydrocolloid with a higher temperature resistance, or by using excess alginate, therewith now avoiding end-products with a less desirable texture due to the hydrocolloid content.

The invention is further explained in the experimental part of this description without limiting the invention thereto.

Experimental Part

Methods

Starches used are common potato starch (PS), waxy corn (maize starch (WMS) and amylose free or amylopectin potato starch (APS) containing essentially only amylopectin molecules.

Recipe Instant Bakery Cream I:

|  | % | g |
|---|---|---|
| Instant modified starch | 20.00 | 80.0 |
| Whole milk powder | 30.00 | 120.0 |
| Powdered sugar | 47.50 | 190.0 |
| Alginate blend* | 2.25 | 9.0 |
| Colour/vanilla flavour | 0.25 | 1.0 |

*Lacticol F336 which less stable towards baking or Lacticol F616 which is more stable and known to cause less bake-out. (Supplier Danby food ingredients.)

Preparation Procedure:
 The dry ingredients are blended.
 The powdered mix (400 g) is added to 1000 ml tap water and stirred for 3 minutes using a Hobart mixer (high speed).

Recipe Instant Bakery Cream II:

|  | % | g |
|---|---|---|
| Instant modified starch | 122.50 | 90.0 |
| Powdered sugar | 42.50 | 170.0 |
| Dextrose monohydrate | 10.50 | 42.0 |
| Low fat milk powder | 16.75 | 67.0 |
| Vanalata* | 6.00 | 24.0 |
| Alginate blend* | 1.50 | 6.0 |
| Colour/vanilla flavour | 0.25 | 1.0 |

*Supplier Kievit
**Lacticol F616

Preparation Procedure
 The dry ingredients are blended.
 The dry mix is added to 1000 ml of tap water and stirred in a Hobart mixer for:
1 minute level 1
1 minute level 2 and
30 sec at level 1

Recipe Fruit Filling III

|  | % | g |
|---|---|---|
| Powdered sugar | 7 | 15 |
| Instant modified starch | 3, 7 | 8 |
| Apple juice | 89, 3 | 192 |

Preparation Procedure
 The dry ingredients are blended. The powdered mix (23 g) is added to the apple juice (192 g) and stirred with a hand mixer at speed 1 for 20 seconds. The viscous mass is transferred to a 250 ml beaker and placed in a temperature controlled waterbath at 20° C. for 30 min.

Baking Stability for Recipe I and II, Expressed as Percentage Bake-out

Baking stability is measured by measuring the bake-out (liquefaction and subsequent elongation of the diameter during and after the baking process) of a slice of bakery cream of 6.3 cm upon baking for 10 (recipe I) or 20 min (recipe II) at 200° C. Bake-out is expressed as the percentage of elongation of the diameter of saidslice of bakery cream seen after baking. The lower the percentage bake-out is, the better is the baking stability of the cream.

Baking Stability for Recipe III

The viscosity of the filling is measured with a Brookfield LVF. The mixture is baked in an oven at 175° C. for 45 min. The viscosity is measured again. The baking stability is expressed as the ratio of the viscosity before and after baking. The lower the ratio the better the baking stability.

Gel Strength

Gel strength is measured using a Brookfield HAT or a Stevens.

Results

TABLE 1

Properties of products A–I in recipe I using Lacticol F336 (Brookfield HAT)

| Product | Starch | Modification | Viscosity mPas | Bake-out % |
|---|---|---|---|---|
| A | PS | STMP/Ac | 120000 | 31 |
| B | PS | STMP/Ac | 118000 | 28 |
| C | PS | STMP/Ac | 114000 | 26 |
| D | WMS | Adip/Ac | 100000 | 24 |
| E | WMS | Adip/Ac | 128000 | 18 |
| F | APS | Adip/Ac | 174000 | 2 |
| G | APS | Adip/Ac | 164000 | 11 |
| H | APS | STMP/Ac | 158000 | 9 |
| I | APS | Adip/Ac | not meas. | 16 |

TABLE 2

Properties of products A–H in recipe I using Lacticol F616 (Brookfield HAT)

| Product | Starch | Modification | Viscosity mPas | Bake-out % |
|---|---|---|---|---|
| A | PS | STMP/Ac | 136000 | 9 |
| B | PS | STMP/Ac | 146000 | 9 |
| C | PS | STMP/Ac | 127000 | 8 |
| D | WMS | Adip/Ac | 129000 | 8 |
| E | WMS | Adip/Ac | 134000 | 2 |
| F | APS | Adip/Ac | 171000 | 0 |
| G | APS | Adip/Ac | 160000 | 0 |
| H | APS | STMP/Ac | 182000 | 2 |

TABLE 3

Properties of products A–H in recipe II using Lacticol F33 (Stevens)

| Product | Starch | Modification | Viscosity mPas | Bake-out[1] % | Viscosity mPas | Bake-out[2] % |
|---|---|---|---|---|---|---|
| A | PS | STMP/Ac | 130 | 55 | 200 | 51 |
| B | PS | STMP/Ac | 130 | 55 | 220 | 55 |
| C | PS | STMP/Ac | 130 | 60 | 200 | 62 |
| D | WMS | Adip/Ac | 150 | 54 | 220 | 55 |
| E | WMS | Adip/Ac | 140 | 47 | 210 | 50 |
| F | APS | Adip/Ac | 230 | 21 | 330 | 17 |
| G | APS | Adip/Ac | 220 | 34 | 330 | 28 |
| H | APS | STMP/Ac | 210 | 24 | 300 | 22 |

[1]Bake-out was measured of bakery cream baked directly after preparation.
[2]Bake-out was measured of bakery cream baked one hour after preparation.

TABLE 4 baking stability of products in recipe III

| Product | Starch | Modification | Viscosity mPas before | Viscosity mPas after | ratio |
|---|---|---|---|---|---|
| A | PS | STMP/Ac | 2180 | 3920 | 0,6 |
| B | PS | STMP | 7780 | 6080 | 1,3 |
| I | APS | Adip/Ac | 960 | 8140 | 0,2 |
| J | APS | Adip/Ac | 3600 | 13400 | 0,3 |
| K | PS | Adip/Ac | 5940 | 8700 | 0,7 |

The invention claimed is:

1. A method for providing baking stability to a filling or topping of a bakery product comprising
   i. adding an acetylated potato starch that has been crosslinked with adipate, wherein said starch has an amylopectin:amylose ratio of at least 99:1 to said filling or topping;
   ii. combining said filling or topping obtained in step (i) with said bakery product to form a combined product; and
   iii. baking said combined product whereby improved baking stability of the filling or topping is achieved as compared to products containing common potato starch and waxy maize starch,
   wherein baking stability is measured by percent bake-out of the filling or topping after baking occurs, and wherein a low percentage of bake-out results in greater baking stability.

2. A method according to claim 1, wherein said starch is from a plant genetically modified to provide reduced amylose content.

3. A method according to claim 2, wherein said plant has been genetically modified by one of modification of, deletion of, insertion in, or antisense reversion of, parts of a gene encoding granule-based starch synthase in said plant.

4. A method according to claim 1, wherein said starch is an instant starch.

5. A method according to claim 1, wherein said topping, or filling is selected from the group consisting of bakery creams, Swiss creams, fruit fillings, savoury or sweet pie fillings, almond paste fillings, choux pastry fillings, pizza toppings, glazes, pastry mixes and cake mixes.

6. A method according to claim 1, wherein said bakery product is selected from the group consisting of savoury snacks, pastries, pizzas, fruit pies and cakes.

7. A method according to claim 1, wherein said filling or topping is a bakery cream or fruit filling.

8. A method according to claim 1, wherein said combined product is baked for 20 minutes at a temperature of 200° C.

9. A method according to claim 1, wherein said combined product is baked for 45 minutes at a temperature of 175° C.

10. A method according to claim 1, wherein aid combined product is baked for 10 minutes at a temperature of 200° C.

* * * * *

UNITED STATES PATENT AND TRADEMARK OFFICE
CERTIFICATE OF CORRECTION

PATENT NO. : 7,282,230 B2
APPLICATION NO. : 10/236435
DATED : October 16, 2007
INVENTOR(S) : Buwalda et al.

It is certified that error appears in the above-identified patent and that said Letters Patent is hereby corrected as shown below:

On The Title Page

Item 74
Now reads:     "(74) *Attorney, Agent, or Firm* — Hoffman & Baron, LLP"

Should read:   -- (74) *Attorney, Agent, or Firm* — Hoffmann & Baron, LLP --

Signed and Sealed this

Twenty-ninth Day of April, 2008

JON W. DUDAS
*Director of the United States Patent and Trademark Office*